Figure 1:
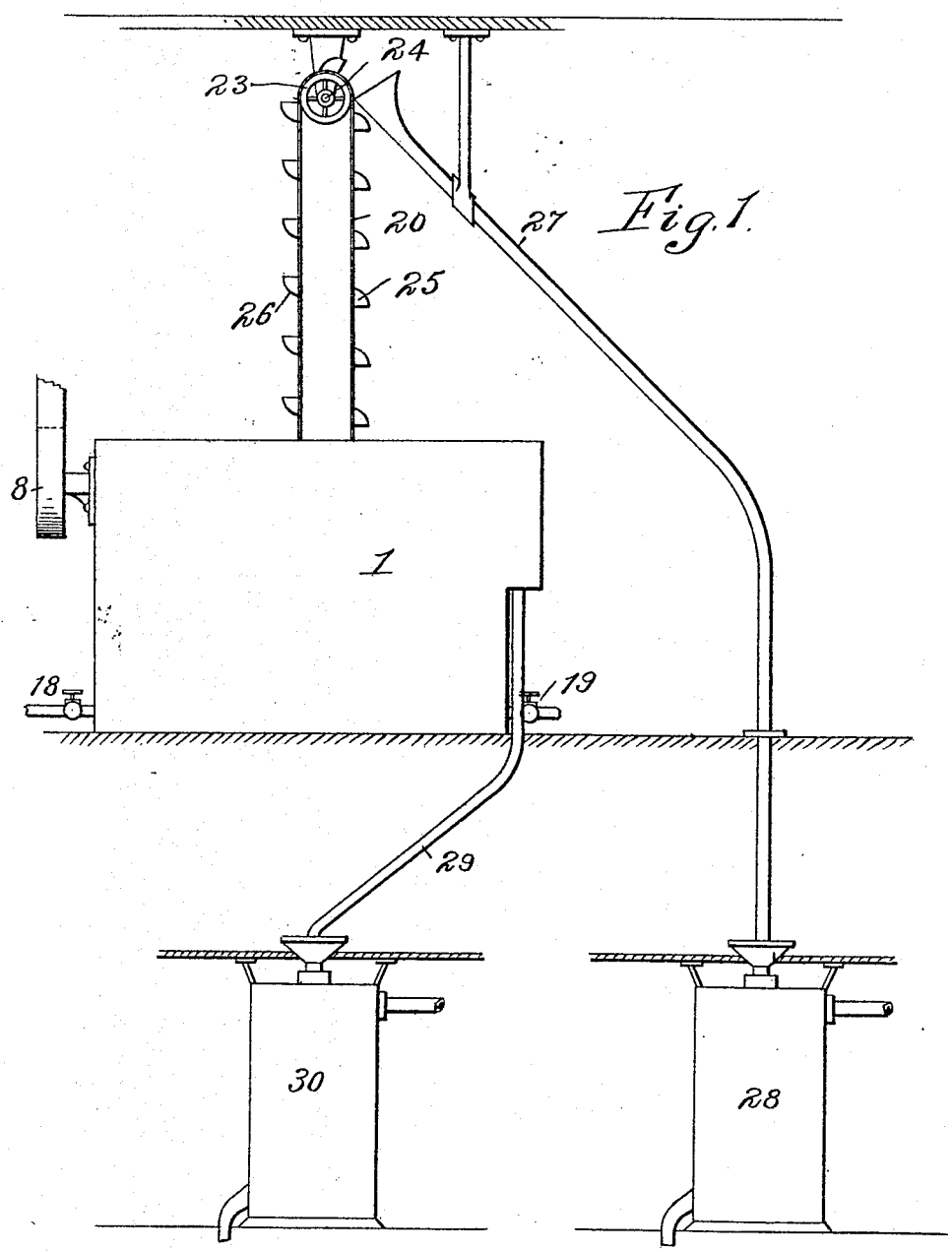

No. 881,861. PATENTED MAR. 10, 1908.
J. M. HERRON.
PROCESS FOR SORTING COCOA BEANS.
APPLICATION FILED JUNE 13, 1905.

3 SHEETS—SHEET 1.

Witnesses
Henry C. Workman
R. F. ____

Inventor
James M. Herron
By his Attorneys
Knight Bros.

No. 881,861. PATENTED MAR. 10, 1908.
J. M. HERRON.
PROCESS FOR SORTING COCOA BEANS.
APPLICATION FILED JUNE 13, 1905.
3 SHEETS—SHEET 2.
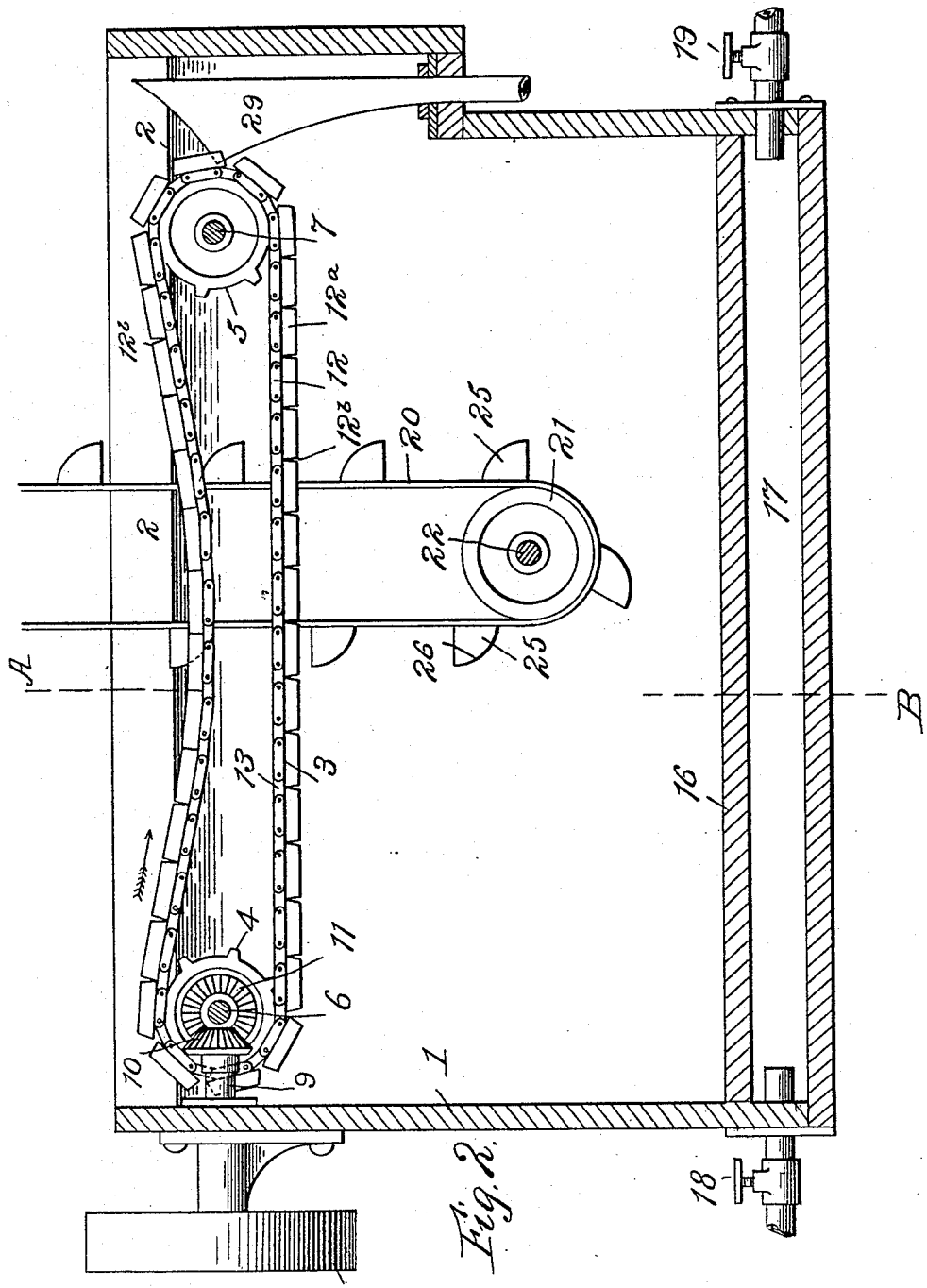

No. 881,861. PATENTED MAR. 10, 1908.
J. M. HERRON.
PROCESS FOR SORTING COCOA BEANS.
APPLICATION FILED JUNE 13, 1905.
3 SHEETS—SHEET 3.
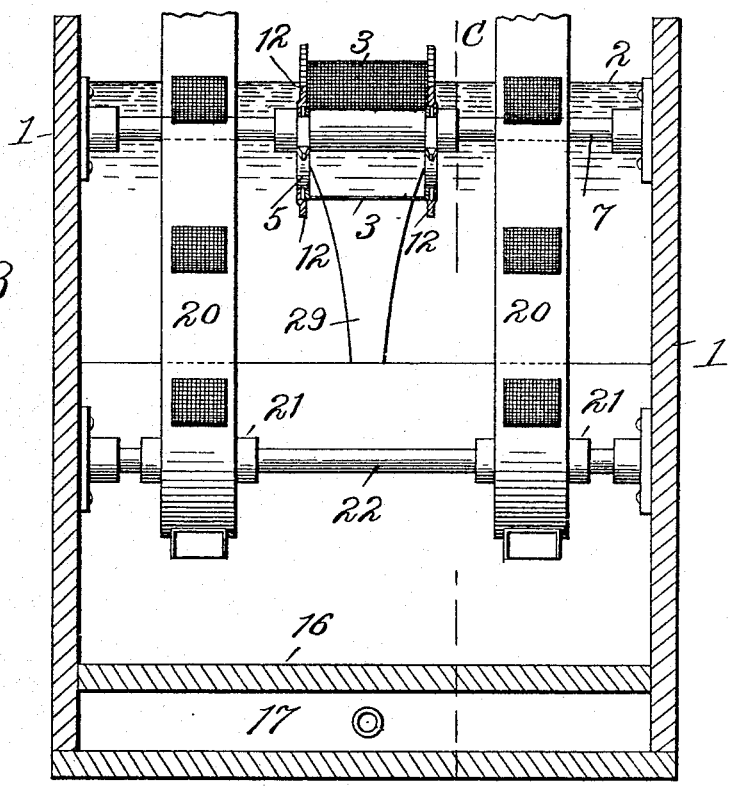
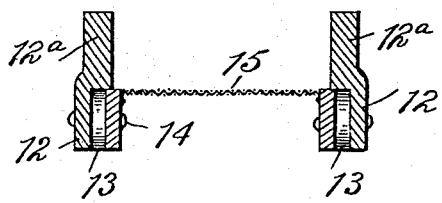
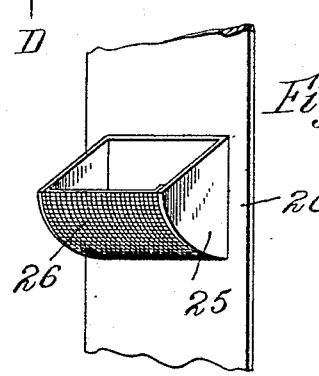

UNITED STATES PATENT OFFICE.

JAMES M. HERRON, OF EAST ORANGE, NEW JERSEY, ASSIGNOR, BY MESNE ASSIGNMENTS, TO CEYLON COCOA & COFFEE COMPANY, A CORPORATION OF NEW YORK.

PROCESS FOR SORTING COCOA-BEANS.

No. 881,861.      Specification of Letters Patent.      Patented March 10, 1908.

Application filed June 13, 1905. Serial No. 265,089.

*To all whom it may concern:*

Be it known that I, JAMES M. HERRON, a citizen of the United States, and residing at Hyde Park, East Orange, county of Essex, and State of New Jersey, have invented a new and useful Process for Sorting Cocoa-Beans, and in order that my invention may be practiced by those skilled in the art I give the following specification.

My invention relates to a process for separating cocoa beans according to their quality or grade, and has for its object a practical, rapid and reliable method for separating "ripe" from "unripe" cocoa beans.

In order that my invention may be understood and the advantages and novel features thereof appreciated, it is necessary to define the terms employed in describing the same and the present state of the art. After harvesting, and before coming on the market, cocoa beans are stored in non-metallic, preferably wood, bins for a time sufficient to allow of heating or "fermenting." Those beans which have properly undergone the heating or "fermenting" are designated "ripe" or fermented beans, and those beans which have not properly undergone the heating are termed "unripe", or unfermented beans. A marked change results in those beans which have properly undergone the "heating" process. Such beans have lost their natural blue color, and have assumed the chocolate color. They have also suffered a marked change in flavor, having lost to a large extent the raw, acrid flavor of the "unripe" bean, and assumed the agreeable chocolate flavor.

In a given mass of beans subjected to this "heating" or "ripening" process a considerable proportion will not have "ripened" in the time when the remainder have properly ripened. Consequently in beans as found on the market a certain proportion are "ripe" and another proportion are "unripe". The market value of a consignment of beans is based upon a rough estimate of the proportion of "ripe" beans which it contains. The method at present practiced for grading or valuing a consignment of beans is to take handfuls of beans from different sacks or from different portions of the mass, split some of the beans thus taken and note the color. According as the proportion of "ripe" beans is large or small, so is the market value of the lot determined. It will readily be perceived that this method is, at best, very crude, and imperfect, and that even the best grade of beans must contain a considerable proportion of "unripe" beans which degrade the market value as well as the intrinsic value of the whole. By my invention, I am enabled to make, practically, a perfect separation of the "ripe" from the "unripe" beans, thereby greatly increasing both the market and the intrinsic value of the beans, since a much better product may be made from a lot of beans all, or practically all, of which are "ripe", than from an equal lot which contains a proportion of "unripe" beans, and also the market value of a lot of beans, practically all of which are "ripe", is much greater than an equal lot containing a proportion of unripe beans.

I have discovered that the separation of "ripe" from "unripe" beans may be effected by submersion in water. The "unripe" beans have apparently a greater specific gravity than the "ripe" beans and are submerged or sink, whereas the "ripe" beans float at or near the surface of the water. I have discovered further that the separation is more effectively and rapidly accomplished when the temperature of the water is raised. The temperature of the water I have found to give the best results is from 85–90° F.

In the accompanying drawings I have illustrated a form of apparatus for carrying out my invention.

Figure 1 of these drawings shows my apparatus as a whole. Fig. 2 is a longitudinal section of the separation tank, taken on the line C, D, Fig. 3. Fig. 3 is a transverse sectional view of the separation tank taken on the line A, B, Fig. 2. Fig. 4 is a transverse sectional detail view of one of the links or members of the conveyer belt. Fig. 5 is a detail perspective view of one of the buckets on the elevator belts.

Similar parts in the several views of the drawings are represented by the same reference numerals.

1 represents the separation tank which may be of any suitable construction and dimensions, partly filled with water, the level of which is indicated by numeral 2. The conveyer belt 3 is supported and guided over sprockets 4 and 5 fixed to shafts 6 and 7 respectively, which have suitable bearings in or secured on the side walls of the tank. The belt is driven from any suitable source of power by belt or other connection to driving pulley 8, secured to a shaft 9, suitably journaled and supported in an end wall of the tank. Secured to the inner end of the tank 9 is a bevel pinion 10, meshing with a similar pinion 11, secured to the shaft 6.

The conveyer belt 3 may be of any suitable construction to carry the cocoa beans through the water in the tank. The floor of the belt or of the separate links thereof, should be of such a character as to permit of escape of the water when the belt carries the beans above the water level and to allow free access of water to the beans on the belt when the belt is submerged. A suitable construction of belt is illustrated in Figs. 2 and 4 of the drawings, in which the same is shown composed of links 12, the side members 12$^a$ of which are elevated to form retaining walls for the beans. These side members are beveled at their ends, as indicated by the numeral 12$^b$, so that when the belt is flexed where it passes beneath the level of the water in the tank, these beveled ends abut, forming, practically, a close joint, as shown in Fig. 2, and also forming continuous side walls to that portion of the belt which carries the beans below the level of the water and prevents them from being washed off the belt. The links 12 are suitably connected together by links 13, the connection being formed by pivot pins 14, as shown.

The floor of the belt 15 is formed of reticulated material, such as wire cloth. As shown in Fig. 3 of the drawings, the conveyer belt 3 is arranged centrally of the tank. The floor of the tank 1 is made double by means of a false bottom 16. Into the space 17 between the bottoms of the tank steam or other heating fluid is caused to flow by means of suitable pipe connections 18 and 19, for the purpose of raising the temperature of the water in the tank.

At each side of the conveyer belt 3 is arranged an elevator belt 20, suitably guided over pulleys 21—21, mounted on a shaft 22 which is suitably journaled and supported in the side walls of the tank. At their upper ends the elevator belts 20 pass over driving pulleys 23 mounted on a suitable shaft 24, which is driven by any convenient connection with the source of power. The elevator belts 20 are provided with buckets 25 which are suitably constructed to pick up and retain the beans and allow the water to flow out, being provided for this purpose with a reticulated bottom 26. The conveyer belts 20 pick up and convey the beans from the tank and discharge them into a chute 27, which leads to a drying apparatus 28 of any suitable construction, such for instance as indicated in the drawings of the centrifugal type where the beans are dried ready for use for market. The belt 3 discharges into a chute 29 leading to a similar drying apparatus 30.

My invention is practiced, with the above described apparatus, as follows: The tank 1 is filled with water to a suitable level with respect to the belt 3, this level being such that the belt at its middle portion dips beneath the surface of the water, and at its ends is raised above the surface of the water. Cocoa beans are fed on to the belt 3, which carries the same into, through and below the level of the water. The water, it is understood, has first been brought to the proper temperature,—say about 80° to 90° F.—by means of the heating medium led into the double bottom of the tank. The "unripe" beans being heavier remain on the belt as the same passes below the water level. The "ripe" beans float off the belt 3 and flow sidewise where they are picked up by the conveyer belts 20 and discharged into the drier 28. The movement of the elevator belts 20 through the water in most cases causes a sufficient movement of the water to cause the "ripe" beans to flow sidewise from the second belt 3. The "unripe" beans which remain on the belt 3 are discharged into the drier 30. Those beans which are in an intermediate condition that is partially "ripe" remain suspended between the level of the water and the belt. If such beans are sufficiently "ripe" so as to remain suspended above the edges of the side pieces 12$^a$ of the links they are considered as sufficiently "ripe" to be gathered with the "ripe" beans. These float off the conveyer to one side or the other, and are picked up by the elevator belts. Those beans which are not sufficiently "ripe" to remain suspended above the sides 12$^a$ of the links remain within the sides of the conveyer and are carried away to the drier 30 as "unripe" beans.

Beans are delivered into the drier 28 of a practically uniform quality that is, they are all "ripe" beans, and as such have a greatly enhanced value on the market and yield in manufacture the highest grade of product, their flavor and color being of the best, and uniform throughout the mass. So far as I am aware cocoa beans of a unform "ripe" quality, such as those coming from the drier 28 constitute a new article of commerce. The "unripe" beans coming from the drier 30 are converted into "ripe" beans by subjecting the same to heating or "fermentation" process in non-metallic vessels as above described to "ripen". The treatment with tepid water is favorable to this subsequent step of ripening, since the presence of moisture and heat assists in the fermentation. The drying in centrifugal driers removes the surplus water on the surface of the beans; but does not thoroughly dry their interior.

By my presence I am enabled to make a practically perfect separation between "ripe" and "unripe" beans and to convert the whole mass including the "unripe" beans into "ripe" beans, thereby greatly increasing not only the market value of a given bulk of cocoa beans, but also enabling products of a much higher grade to be manufactured from such beans.

Having thus described my invention, the following is what I claim as new therein and desire to secure by Letters Patent:

1. The process of separating ripe from unripe cocoa beans, which consists in submerging the mass containing ripe and unripe beans in tepid water and separately gathering the beans which float at or near the surface of the water and those which sink.

2. The process of separating ripe from unripe cocoa beans, which consists in submerging a mass containing both ripe and unripe beans in water at a temperature of about 85° to 90° F. and separately gathering the beans which float at or near the surface of the water and those which sink.

3. The process of treating a mass which contains both ripe and unripe cocoa beans, which consists in carrying said mass into and through a body of tepid water, separately collecting and drying those beans which float at or near the surface of the water, and separately gathering those beans which remain upon the carrier, removing the water adhering thereto, and subjecting said beans to a ripening process, substantially as described.

JAMES M. HERRON.

Witnesses:
WILLIAM P. HAMMOND,
HENRY C. WORKMAN.